US006348970B1

(12) United States Patent
Marx

(10) Patent No.: US 6,348,970 B1
(45) Date of Patent: *Feb. 19, 2002

(54) APPARATUS AND METHOD FOR INTERFACING A COMPUTER NETWORK TO A FACSIMILE MACHINE

(75) Inventor: Adam N. Marx, Boulder, CO (US)

(73) Assignee: Qwest Communications Int'l., Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,363

(22) Filed: Apr. 29, 1998

(51) Int. Cl.⁷ .................................................. G06K 9/00
(52) U.S. Cl. ................. 358/1.15; 382/219; 379/100.07; 707/3; 358/468; 358/403
(58) Field of Search ............................... 358/1.15, 403, 358/448, 468, 402, 438, 439, 440, 442; 382/219, 306; 707/3, 4, 5, 6, 10, 501, 506, 507, 513; 709/216, 217, 218, 219; 379/100.01, 100.07, 100.11, 100.12

(56) References Cited

U.S. PATENT DOCUMENTS

| | | | | |
|---|---|---|---|---|
| 5,274,468 A | | 12/1993 | Ojha | 358/448 |
| 5,613,012 A | | 3/1997 | Hoffman et al. | 382/115 |
| 5,692,073 A | * | 11/1997 | Cass | 382/219 |
| 5,903,729 A | * | 11/1997 | Reber et al. | 709/219 |
| 5,848,413 A | * | 12/1998 | Wolff | 707/10 |
| 5,870,549 A | * | 2/1999 | Bobo, II | 709/206 |
| 5,873,077 A | * | 2/1999 | Kanoh et al. | 707/3 |
| 5,915,001 A | * | 6/1999 | Uppaluru | 379/88.22 |
| 5,933,829 A | * | 8/1999 | Durst et al. | 707/10 |
| 6,199,071 B1 | * | 3/2001 | Nielsen | 707/204 |

OTHER PUBLICATIONS

Fax: Digital Facsimile Technology and Applications, Second Edition by Dennis Bodson, Kenneth R. McConnell and Richard Schaphorst; 1992 Artech House, Inc.; pp. 19–92.
The Whole Internet User's Guide & Catalog by Ed Krol; O'Reilly & Associates, Inc. Sep. 1992; pp. 228, cover page, chapter 2 pp. 31–37,40, chapter13, pp.388, 390, 395–396.
The Systems Programming Series Fundamentals of Interactive Computer Graphics, by J. D. Foley and A. Van Dam; 1982 by Addison–Wesley Publishing Company, Inc. reprinted with corrections, Jul. 1984; pp. 167–168; 200–203, 9.12 Extents, p. 376.

* cited by examiner

Primary Examiner—Edward Coles
Assistant Examiner—Joseph R. Pokrzywa
(74) Attorney, Agent, or Firm—Marsh Fischmann & Breyfogle, LLP

(57) ABSTRACT

An apparatus and method provide for interfacing a facsimile machine with a computer network. Specifically, an apparatus provides a fax interface for exchanging faxes with fax machine and a network interface for communicating with and retrieving electronic documents from a computer network. The apparatus further includes a memory for storing the electronic documents received from the computer network and the faxed pages received from the fax machine and a controller for comparing the electronic documents to the faxed pages. The apparatus may be employed to retrieve various electronic documents from the computer network in response to received faxes.

15 Claims, 8 Drawing Sheets

APPARATUS AND METHOD FOR INTERFACING A COMPUTER NETWORK TO A FACSIMILE MACHINE

BACKGROUND OF THE INVENTION

1. Field of the Invention

This invention relates generally to computer communications and control, and more particularly to an apparatus and method for interfacing to and controlling a computer network with a facsimile machine.

2. Description of the Related Art

The Internet is a collection of interconnected computers and computer networks that communicate and share services with each other. The Internet began more than 20 years ago with the U.S. Defense Department's ARPAnet. At the same time that ARPAnet was maturing (it subsequently ceased to exist), similar networks were developed to link universities, research facilities, businesses, and individuals around the world. These networks included BITNET, CSNET, FIDONET, and USENET. Eventually, each of these networks were themselves linked together, allowing users of any computer linked to any one of the networks to transmit communications to computer users on other networks. It is this series of linked networks that is today commonly known as the Internet.

The most common methods of communications on the Internet can be roughly grouped into six categories: (1) one-to-one messaging (such as "e-mail"), (2) one-to-many messaging (such as "e-mail" and "listserv"), (3) distributed message databases (such as "USENET newsgroups"), (4) real time communication (such as "Internet Relay Chat"), (5) real time remote computer utilization (such as "telnet"), and (6) remote information retrieval (such as "ftp," "gopher," and the "World Wide Web").

Electronic mail, or "e-mail", allows a user to create a message and send it to one or more people. The message is not limited to text, but can contain data, computer programs, audio, images, and even video.

The Internet also contains automatic mailing list services (such as "listservs" which is short for list server) that allow a group of people to communicate about particular subjects of interest. A listserv subscriber can submit messages on a particular topic to the listserv. The listserv forwards the message (via e-mail) to anyone who has subscribed to the mailing list. A recipient of such a message can reply to the message and have the reply also distributed to everyone on the mailing list.

Similar in function to listservs—but quite different in how communications are transmitted—are distributed message databases such as "USENET newsgroups." Because the messages are shared in a database, users need not subscribe to the discussion mailing list in advance, but can instead access the database at any time.

In addition to transmitting messages that can be later read or accessed, Internet users can engage in "real time" dialog with other people on the Internet. In its simplest forms, "Internet Relay Chat" (or IRC) allows two or more users to type messages to each other that almost immediately appear on the others' computer screens.

The Internet can also be used to access and remotely control computers using "telnet." Telnet allows a user to enter commands on one computer and have them executed on a remotely connected computer. For example, using telnet, a researcher at a university would be able to use the computing power of a supercomputer located at a different university, while a student can use telnet to connect to a remote library to access the library's on-line card catalog program.

The final major category of communication, and perhaps the most well known use of the Internet, is remote information search and retrieval. Today, three methods are primarily used to locate and retrieve information on the Internet. The first, "ftp" (or file transfer protocol) allows a user to list files available on a remote computer and to transfer one or more of those files to the individual's local computer. The second approach uses a text based display format called "gopher" to guide an individual's search through the resources available on a remote computer. The third approach, and fast becoming the most well known, is the "World Wide Web" (the "Web").

The Web links information on various computers by using a common set of protocols and defined conventions for storing and transferring information. One of the most common information storage formats is hypertext markup language (HTML). HTML documents are transferred between computers using hypertext transport language (HTTP).

Although the information itself may be in many different formats and stored on computers which are not otherwise compatible, a basic set of standards exist that allow communication and exchange of information between differing computers. Several programs allow users to "browse" the web by displaying HTML documents. Mosaic, Cello, and Netscape are a few of the more popular browsers widely used to navigate the Internet. Each of these programs translates and formats the HTML document before displaying it to the user.

Although HTML documents contain only textual information, most documents contain one or more unique addresses, called a Uniform Resource Locator or URL. Each URL is comprised of a filename and filepath that refers to an electronic document that can contain text, images, sound, animation, moving video, and even computer programs.

Embedding URLs in an HTML document allows that document to link (each link is typically referred to as a hyperlink) to other Internet documents or resources. Thus, a hyperlink allows the referenced document to be automatically retrieved and displayed, regardless of where it is stored. In some instances, the document will cause the browser to retrieve the linked data automatically. In other instances, the user will be given the option of retrieving the information.

Many browsers use a graphical user interface (GUI) that allows the user to select the hyperlink, (i.e. retrieve the document) with a mouse. For example, a user viewing an HTML document (often called a "web page"), on a computer screen can use a mouse to "click" on a resource description and be immediately connected to or retrieve the resource itself.

Hyperlinks are displayed on a GUI in numerous ways. Most browsers display hyperlinks as blue or underlined text. In many cases, the actual URL is not displayed on the GUI. Instead, a more descriptive title, called a hypertext reference, is displayed.

In other situations, the hypertext reference is an image rather than text. This type of hypertext reference is often referred to as an image map. A user can retrieve different documents from an image map, depending on location of the mouse click on the image map. In this situation, the browser typically transmits the screen coordinates of the mouse click to the server hosting the image map. The server then matches the mouse click coordinates to a specific document that is then transmitted to the user.

Many organizations and computer users have "home pages" on the Web. These are documents which provide a set of links that guide the user directly or indirectly to information about or relevant to that organization. Most browsers are configurable to immediately retrieve a home page of the user's choice upon startup.

Many browsers also provide control functions that allow the user to customize the browser to fit the particular user's tastes. Perhaps one of the most frequently used functions is storing a particular link in a list of frequently used links.

A variety of systems have been developed that allow Web users to search for specific information contained on the web. Services such as Yahoo, Magellan, Altavista, Webcrawler, and Lycos are all services known as "search engines" which allow users to search for Web sites containing certain categories of information, or to search for key words. For example, a Web user looking for information would type key words into a search engine and then be presented with a list of web sites containing those key words. This resulting list is actually a series of hyperlinks to those sites. The user could then follow individual links, browsing through the information on each site, until the desired material is found.

Two common methods are used to accesses the Internet. The first, host access, refers to a computer or computer network that is directly connected to the Internet. The second, terminal access, allows a user having a personal computer with a modem to connect to a larger computer or computer network, commonly referred to as a server, that is itself directly or indirectly connected to the Internet. Unfortunately, both types of Internet access require a computer. Thus, those that do not have the requisite network connections, computer equipment or skills are unable to access the vast wealth of information contained on the Internet.

Businesses are continuing to deliver product information and services via the Internet. Unfortunately, penetration for these types of services is limited by the number of people having Internet access. Although the number of people having Internet access continues to grow every year, a significant portion of the population does not have Internet access.

Some attempts have been made to provide Internet access for those that do not have a computer or the requisite skills. Currently, two products allow limited Internet access to and from a fax machine. One product faxes a web page based on a user's telephone touch tone input of a URL. Another product preprocess web pages by adding identifying numbers next to each hyperlink on the web page. To access a document, the user must call a phone number and then enter a user identification and the particular identifying number that corresponds to the hyperlink he or she wants to access. Unfortunately, both of these solutions are rather cumbersome and difficult to use.

SUMMARY OF THE INVENTION

The present invention discloses a fax/Internet-server that allows information to be exchanged between a fax machine and one or more computers. The fax/Internet-server comprises a fax interface for sending and receiving faxes and a network interface for communicating with and retrieving electronic documents from a computer. The fax/Internet-server further includes a memory for storing the electronic documents received from the computer network and the faxed pages received from the fax machine. The fax/Internet server also includes a controller that compares the stored electronic documents to the received faxed pages, to identify user marks on the received fax. Various actions will be performed, depending on the user marks. A method is also disclosed for using the apparatus to retrieve various electronic documents from the computer network in response to received faxes.

DESCRIPTION OF THE PREFERRED EMBODIMENT

Figure 1:
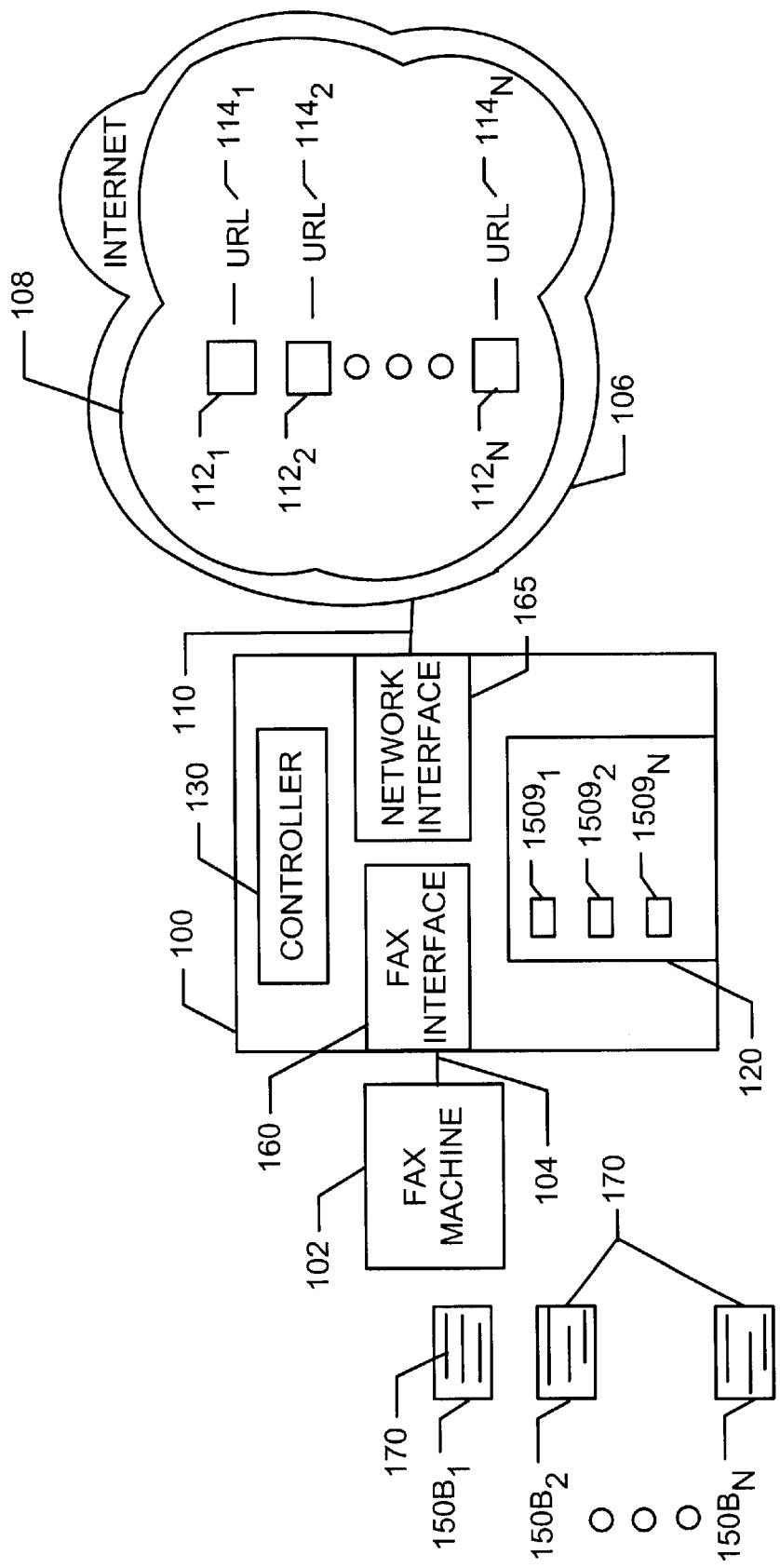
FIG. 1 is a block diagram of a fax/Internet server constructed in accordance with the present invention.

FIG. 1 depicts a fax/Internet-server 100, constructed in accordance with the present invention. Server 100 is connected to a fax machine 102, via communication link 104, and to the Internet 106, and in particular to the web 108, via digital link 110. Server 100 contains a fax interface 160 for communicating with fax machine 102 via communication link 104 and a network interface 165 for communicating with Internet 106 via digital link 110. Server 100 also contains a memory 120, for storing a plurality of transmitted control pages 150a, and a controller 130.

As understood by those in the art, web 108 contains a plurality of documents 112. Each document 112 is identified by a unique Uniform Resource Locator (URL) 114, which indicates the host name, directory name, and file name of the document and the protocol to be used to transfer the information in the file. The organization and relationship of the Internet 106, web 108, documents 112 and URLs 114 is further described in "The Whole Internet User's Guide & Catalog" by Ed Krol, second edition 1994, incorporated herein by reference.

The present invention allows a user, who has access to fax machine 102, to retrieve documents 112 from the web 108, by placing one or more marks 170 on one or more of a plurality of user control pages 150b. The positions of marks 170 on control page 150b are used by server 100 to perform various actions as will be described in greater detail below. Server 100 stores, in memory 120, an image of each of the transmitted control pages 150a.

Thus, memory 120 contains an image of the transmitted control page 150a sent to fax machine 102. It should be noted that control page 150a corresponds to user control page 150b prior to any marks 170 being placed thereon. In the preferred embodiment, each control page 150a is stored as a bitmapped image in memory 120.

Server 100 is also capable of generating a large number of unique control pages 150a and 150b. Typically, each set of control pages 150a and 150b corresponds to a unique document 112 of web 108. As will be described in greater detail below, server 100 is also capable of generating control pages 150a and 150b that do not correspond to a document 112. Such control pages are used for special data entry or command functions.

Server 100 can be modified to operate with any device that transmits and/or receives, via analog or digital protocols, a bit mapped image of control pages 150a and 150b. For example, one possible configuration for server 100 includes a Compaq ProLiant 7000 server, one or more T-1 Interface boards, and one or more Brooktrout fax boards. Suitable software for use with this system includes Windows NT 4.0 as the operating system, RightFAX NT 4.5 fax software, and Netscape SuiteSpot 3.5 Professional Edition Web Server Suite.

In the present invention, fax machine 102 converts user control page 150b into a bitmapped image for transmission to server 100 via link 104. Controller 130 compares the received user control page 150b with transmitted control page 150a, thus allowing controller 130 to determine whether the user has made one or more marks 170 on user control page 150b. The controller can determine the position of the user marks by comparing corresponding bits in the two bitmaps to determine where a change has occurred. Depending on the position of a mark 170 on a user control page 150b, server 100 will either: (1) retrieve documents 112 from web 108 and send bitmapped images to fax machine 102 or (2) perform a variety of other actions.

Fax machine 102 may be a conventional fax machine or any other device capable of receiving and transmitting bitmapped image data via communication link 104. For example, device 102 may be a fax modem connected to a computer. It is preferred that fax machine 102 be a CCITT group III fax machine, described in detail in Chapter 3 of *FAX: Facsimile Technology and Application Handbook, 2nd Edition* by McConnell et. al., published by Artech House in 1992 and incorporated herein by reference. Group III fax machines include most fax machines in current use and utilize an analog protocol that permits a 200 dpi resolution with 1728 dots per line and 2200 scanning lines per page. Although server 100 is intended to be compatible with group III fax machines, those skilled in the art will recognize that other embodiments are possible.

Communication link 104 can have different embodiments including a wire or wireless telephone connection, coaxial cable, PCS, or a satellite channel. Those skilled in the art will recognize that other embodiments of communication link 104 are possible so long as it is capable of carrying the electrical impulses between fax machine 102 and server 100. Although analog communication links are used for communications to and from Type III fax machines, communication link 104 could be digital if the fax machine 102 and server 100 are set up for digital communications.

Digital link 110 is a 2-way communication link to Internet 106. link 110 can be directly connected to Internet 106, or indirectly connected (or "hosted") through one or more other computers or telecommunication systems (not shown). In the preferred embodiment, link 110 utilizes Transmission Control Protocol/Internet Protocol (TCP/IP). Link 110 uses several data dependent protocols in addition to TCP/IP. For example, HTTP is used for the transfer of HTML documents, UDP is used with FTP, and SMTP is used to transmit e-mail messages. It should be appreciated that an analog link could be used between a server and a network, provided that the server and the network include analog communications interfaces.

Memory 120 will typically be comprised of random access memory (RAM), a disk drive, or a combination of both. Those skilled in the art will recognize that server 100 can be modified to compress the bitmapped image of control page 150a to utilize memory 120 more efficiently.

Figure 2A:
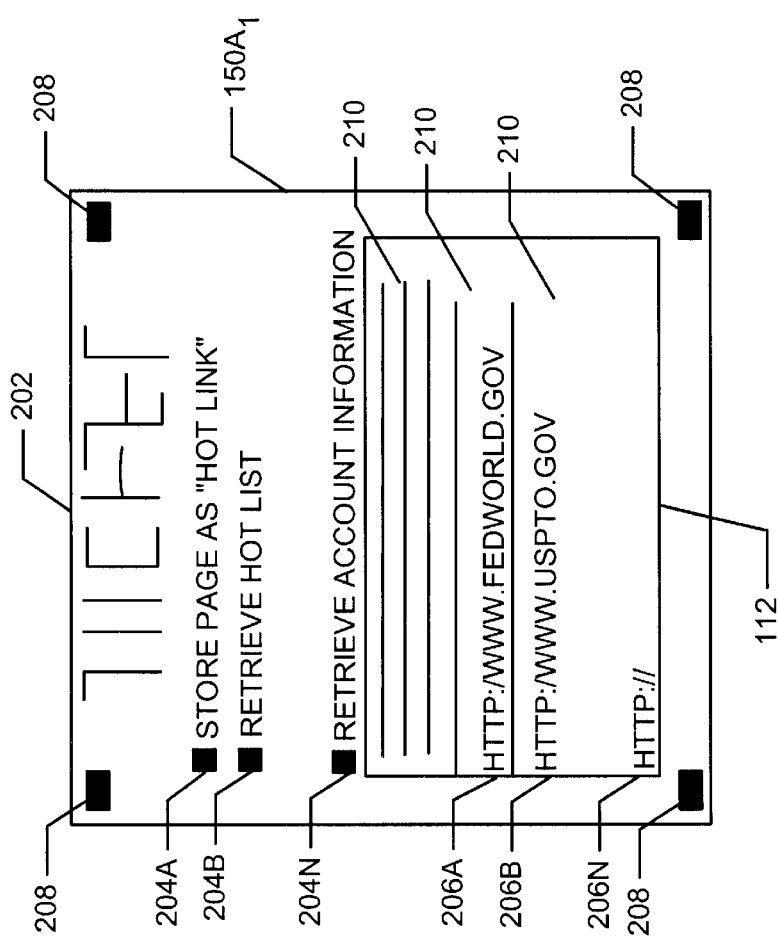
FIG. 2a depicts an example of a control page of the present invention.
Figure 2B:
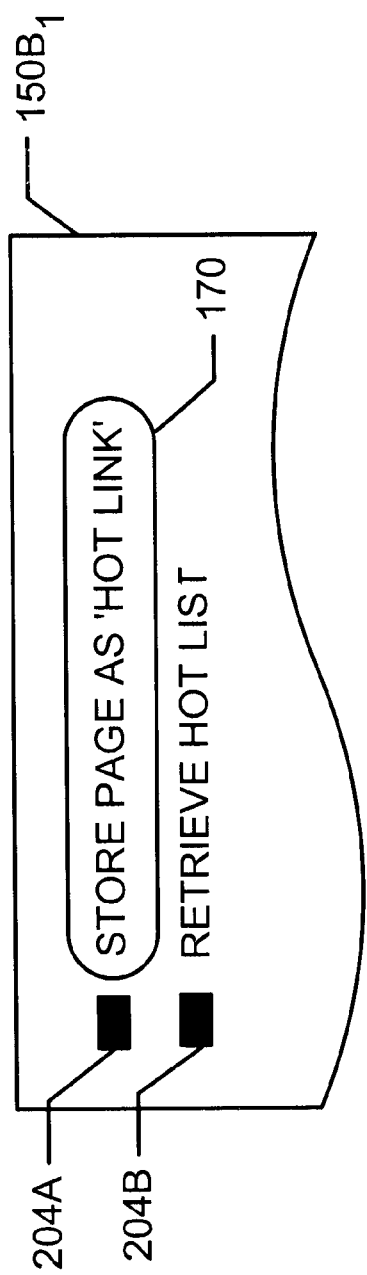
FIG. 2b depicts an example of a user control page of the present invention.

FIGS. 2a and 2b further depicts control pages 150a, and 150b, respectively. Please note that the subscripts are used to identify corresponding pairs of transmitted control pages and user control pages. It should also be noted that the same reference figures are used throughout the description of the invention, to identify like elements. In the preferred embodiment, control pages 150a, and 150b contain identifying information 202, control symbols 204, URL symbols 206, and skew indicators 208.

Identifying information 202 contains unique codes that identify a specific user as well as a specific control page 150a, and 150b. Having identifying information 202 identify a specific user allows server 100 to perform cost and use tracking. If such tracking is not required, identifying information 202 need only identify a specific control sheet. Identifying information 202 can take various printed forms. Some forms are quite simple such as a bar-code, while other embodiments are more sophisticated such as GLYPHS offered by Xerox Corporation, or Teleforms offered by Cardiff Software, Inc.

Referring to FIG. 1 and FIG. 2, user control page 150b, allows a user to control server 100 by placing marks 170 around various control symbols 204 and URL symbols 206 and then faxing user control page 150b to fax server 100. In the preferred embodiment, a user places circular marks 170 around control symbols 204 and URL symbols 206.

Those skilled in the art will recognize other marking schemes that can be used and which are consistent with the teachings of this inventions. For example, server 100 could be modified to recognize check marks, underlining, scribbling, shading, or even handwritten instructions.

Server 100 performs a variety of functions based on the location of marks 170 with respect to various control symbols 204 and URL symbols 206. Table 1 sets forth a few examples of various control symbols 204 and the associated action server 100 will perform if that control symbol 204 is marked. Although only a few control symbols 204 are described in Table 1, those skilled in the art will recognize other control symbols 204 that could be used consistent with the teachings of this invention. Those skilled in the art will also recognize that each control symbol 204 can have a variety of printed forms, depending on the particular implementation.

TABLE 1

EXEMPLARY CONTROL SYMBOLS 204

| Control Symbol | Action |
| --- | --- |
| (hyperlink) | Server 100 sends an image of the document associated with the hyperlink to fax machine 102. |
| ADD TO HOTLIST | Store the current URL in a user's hotlist. A hotlist is a list of URL's frequently visited by the user and is stored in memory 120. |
| PRINT HOTLIST | Generate and send a transmitted control page 150a to fax machine 102 listing the user's current hotlist. |
| FORWARD | Generate and send a transmitted control page 150a to fax machine 102 corresponding to the next entry in a history list. Note: forward is only available after you use Back or a history item. |
| BACKWARD | Generate and send a transmitted control page 150a to fax machine 102 corresponding to the previous |

TABLE 1-continued

EXEMPLARY CONTROL SYMBOLS 204

| Control Symbol | Action |
| --- | --- |
| | entry in the history list. |
| HOME | Server 100 sends an image of the document associated with the user's home page to fax machine 102. |
| SEARCH (text) | Server 100 searches Internet 106 for "text" and generates and sends a transmitted control page 150a to fax machine 102 with the results. |
| GOTO (url) | Server 100 sends an image of the document associated with the URL to fax machine 102. |
| SHOW/HIDE | Causes server 100 to either display or suppress printing of control symbols 204 on transmitted control pages 150a. |
| SUBSCRIBE (newsgroup) | Subscribe to a listserv or newsgroup. Fax server 100 will convert and fax electronic messages, related to a newsgroup, in the form of a control page 150a, to the user. |
| SEND E-MAIL (message) (address) | Server 100 sends a handwritten message (in bit-mapped form) or a text message to a user indicated address |
| FORWARD E-MAIL (address) | Server 100 sends a message to a user indicated address |
| IRC LOG (IRC database) | Server 100 will fax a user the message log for a specific IRC database |
| FTP (command) | Allows a user to perform a specific command |
| TELNET (command) | Allows a user to perform a specific telnet command |

URL symbols 206 are a special type of control symbol detectable by server 100 for use in retrieving the document 112 associated with that particular URL symbol 206 from web 108. As will be more fully described below, server 100 uses identifying information 202 to assist in identifying which symbols have been marked by the user.

Figure 2C:
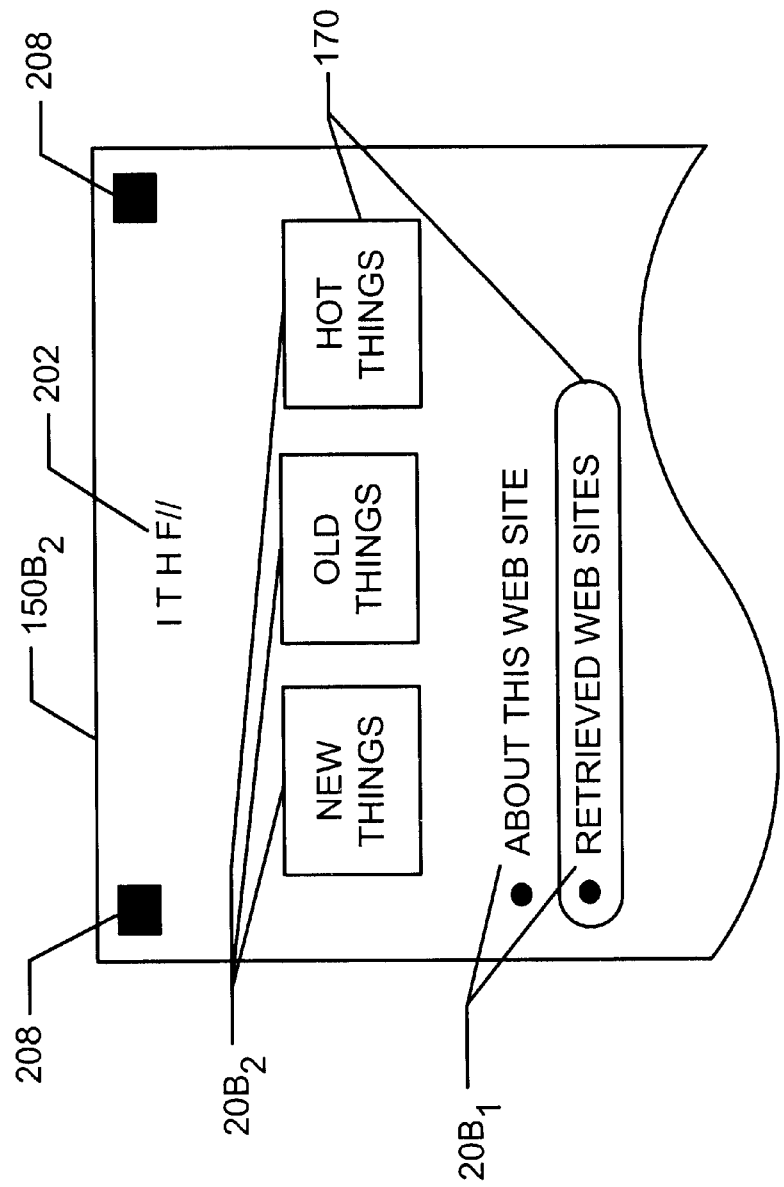
FIG. 2c depicts another example of a user control page of the present invention.

FIG. 2c discloses a portion of yet another example of a user control page 150$b_2$. This embodiment of user control page 150$b_2$ contains a plurality of hypertext referenced URL symbols 206$_1$ and graphical or image mapped URL symbols 206$_2$. A user has placed marks 170 around one or more of the URL symbols 206 on user control page 150$b_2$ to indicate that server 100 is to retrieve, from web 108, the document(s) 112 corresponding to the marked URI, symbol(s). Those skilled in the art will recognize that this particular embodiment of user control page 150$b_2$, more closely resembles the typical document 112 contained in web 108.

Figure 3A:
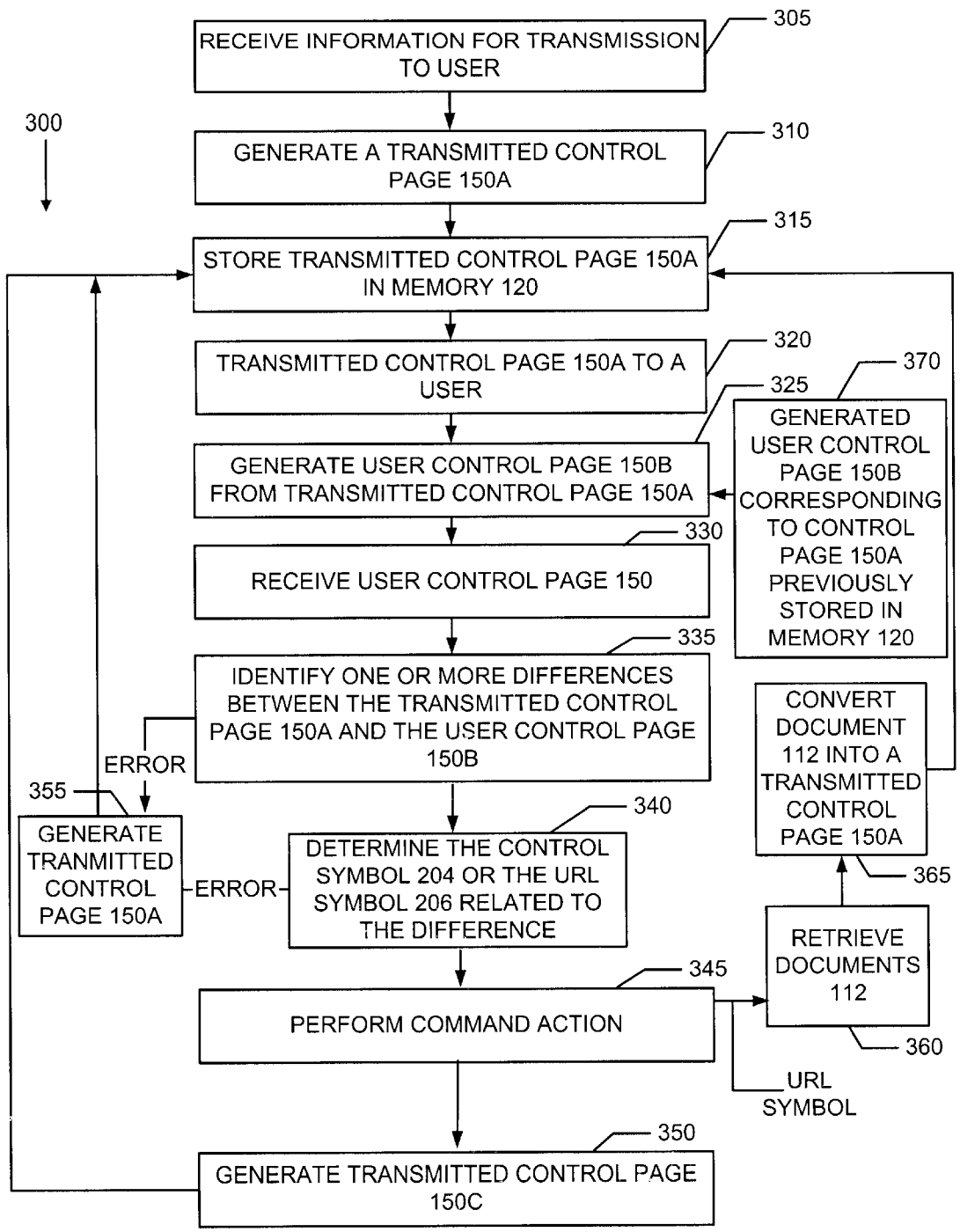
FIG. 3a is a block diagram of the method of the present invention.
Figure 3B:
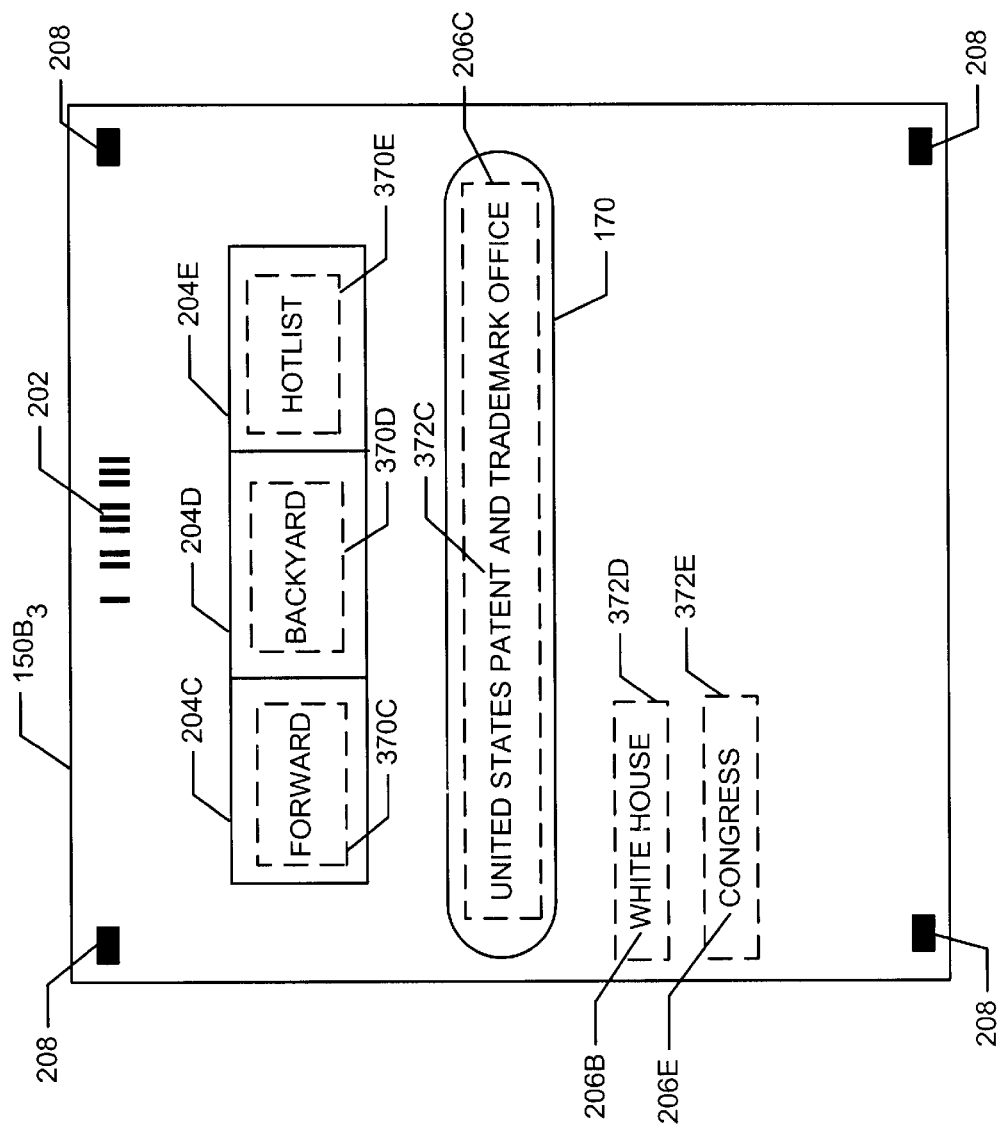
FIG. 3b depicts another example of a user control page of the present invention.
Figure 3C:
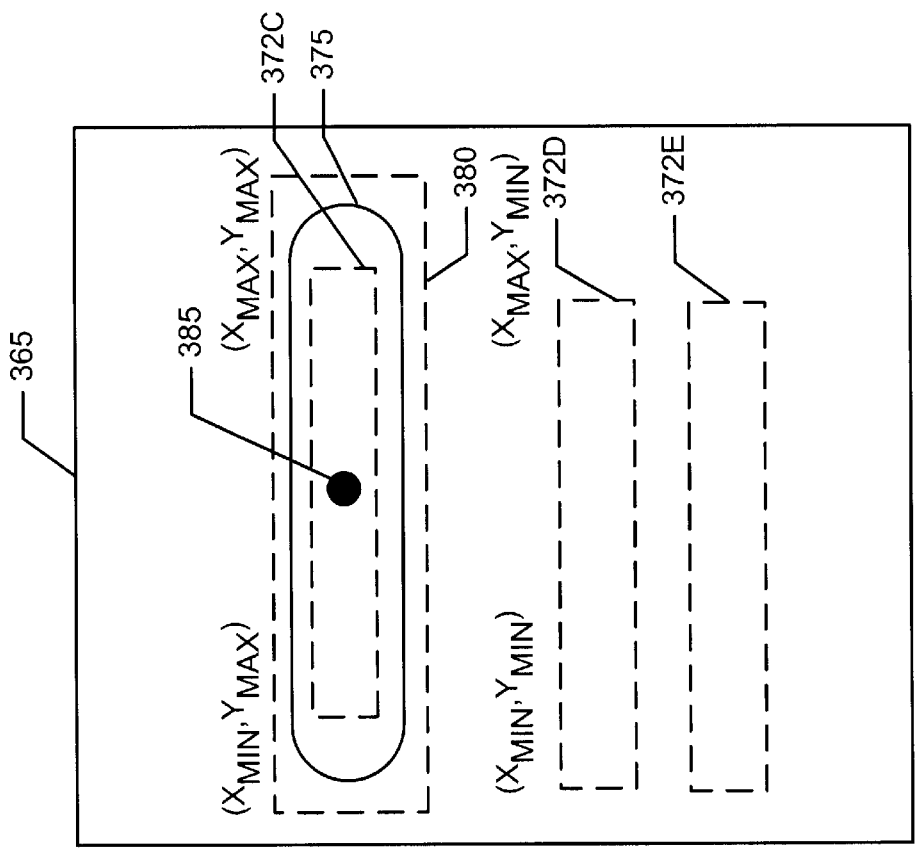
FIG. 3c depicts some of the image processing functions performed by the present invention.

FIG. 3 is a block diagram depicting the method of operation of the present invention denoted generally by reference numeral 300. As seen therein, the method for exchanging information between fax machine 102 and Internet 106 may be initiated when server 100 receives information for transmission to a user (305). This information may be received from another user directly connected to server 100, or it may be received from a remote source via communications link 110 and network interface 165. The method further comprises the steps of generating (310) a transmitted control page 150a, storing (315) the transmitted control page 150a in memory 120, transmitting (320) the transmitted control page 150a to a user, generating (325) a user control page 150b, receiving (330) the user control page 150b, identifying (335) one or more differences (depicted by reference number 375 in FIG. 3c) between the transmitted control page 150a and the user control page 150b, and determining (340) the control symbol 204 or the URL symbol 206 associated with the identified difference. If a control symbol 204 is associated with the identified difference, the method further comprises performing (345) a command action, generating (350) a transmitted control page 150c, to confirm the action, and returning to step 315. If a URL symbol 206 is associated with the identified difference, the method further comprises retrieving (360) a document 112, converting (365) the document 112 into a transmitted control page 150a, and returning to step 315. If neither a control symbol 204 nor a URL symbol 206 is associated with the difference, the method further comprises generating (355) a transmitted control page 150a, indicative of an error condition, and returning to step 315.

Alternatively, method (300) can be initiated when a user generates (368) a user control page 150b corresponding to a control page 150a which has previously been stored (315) in memory 120, and for which the user has previously obtained an unmarked user control page 150b, such as by transmission (320) from server 100. In this case, server 100 receives (330) the transmitted user control page 150b and proceeds with the step (335) of identifying one or more differences between the stored control page 150a and the received user control page 150b. The method continues as described above, with generation of a transmitted control page 150a (355) or determination (340) of the control symbol 204 or the URL symbol 206.

When first registering for the service, the user will provide pertinent information such as his or her fax machine telephone number and service preferences. Some exemplary user configuration information is listed in Table 2.

TABLE 2

USER CONFIGURATION INFORMATION

| Option | Description |
| --- | --- |
| default fax number | telephone number used to receive transmitted control pages 150a |
| paper size | choose paper size (letter/legal/variable - variable option available for feed roll faxes) |
| handling options for non-faxable media (video, audio, Java) | choose how to handle items which are non-faxable: (1) for video, either print name of the video file and field type and text describing it as video or print selected video frames; (2) for audio, either print the name of the audio file and file type, or generate telephone number for interactive voice response system where audio can be heard; (3) for Java, either print the name of the audio file and file type, or print screen shoots before, after, and during code execution |
| password | toggle server 100 to prompt user for a password (entered on a bubble form) at the beginning of each session; will also prompt for an initial password |
| load/ don't load images | user may choose not to load images for a faster response time |
| language option (for control symbols 204 error messages instructions etc.) | Select language for system prompts |
| e-mail: fax on receipt | A user may choose to have all e-mail faxed to a specified machine when it is received by server 100 |
| grayscale vs. black and white | user may choose to have his or her transmitted control pages sent in grayscale (for better clarity) or black and white (for greater transmission speed) |
| page forwarding/ duplicating | user can choose to have all transmitted control pages 150a currently being sent to him or her also sent to an additional fax machine. (this option may be useful if a customer also needs this information, or if an employee is at a remote site) |
| double prints | user can choose to have multiple copies of a particular transmitted control page 150a faxed to them. |

The preferences are stored in memory 120 and allow server 100 to initially generate (310) a control page 150a, that corresponds to the user's home page. For some applications, an identical initial control page 150a can be distributed to multiple users. Of course, those skilled in the art will recognize that the initial control page 150a can be partially or fully customized to fit preferences of individual users. In the preferred embodiment the initial control page is stored (315) in memory 120 of server 100 and transmitted (320) to the user.

It should also be noted that control pages 150a do not have to be transmitted (315) directly to the user. Instead, fax interface 160 could transmit (315) user control page 150b to a printer. The printed user control page 150b could then be sent to the user using a mail service.

Once the user receives the transmitted control page 150a, he or she can mark (325) one or more of the control symbols 204 or URI, symbols 206, by placing a mark 170 around (or over, on, or near depending on the embodiment) any of the symbols 204 or 206. As previously described, user control page 150b is used to command server 100 to perform various actions. For example, the user can mark a URL symbol 206 corresponding to a document 112 that she would like retrieved from the world wide web 108. The user could also mark a control symbol 204 that will change user configuration information.

Server 100 receives (330) the user control page 150b from fax machine 102. Those skilled in the art will understand that server 100 may be capable of receiving simultaneous calls from multiple fax machines 102. Upon receiving the user control page 150b, server 100 identifies (335) one or more differences 375 between the transmitted control page 150a and the user control page 150b by performing a bitmap comparison.

FIG. 3b depicts a user control page $150b_3$ that will be used to further explain how server 100 associates a particular user mark 170 with a control symbol 204 or a URL symbol 206. User control page $150b_3$ has a plurality of control symbols 204c, 204d, and 204e, and a plurality of URL symbols 206c, 206d, and 206e. Page extents 370c, 370d, 370e, 372c, 372d, and 372e are non-printed rectangular regions surrounding each control symbol 204 or URL symbol 206. Page extents 370 and 372 are defined, positioned, and associated with one or more control symbols 204 or URL symbols 206 when server 100 generates (310, 350, and 355) a transmitted control page or converts (365) a document 112 into a transmitted control page 150a. Page extents 370 and 372 are stored as a part of the transmitted control page in memory 120. Page extents 370 and 372 are very similar in nature to screen extents which are defined, positioned, and associated with an image on a GUI, as is widely used and understood by those skilled with computer GUI interfaces. Screen extents are further described in *Fundamentals of Interactive Computer Graphics* by Foley and VanDam, Addison-Wesley, 1984, pp. 167–8 , 200–203, and 375–6, incorporated herein by reference.

Each control symbol 204 has a corresponding page extent 370c, 370d, and 370e that is used in determining whether a user has marked a particular control symbol. Likewise each URL symbol 206 also has a corresponding page extent 372c, 372d, and 372e. Please note that page extents 370 and 372 are labeled with different reference numerals for the purpose of showing the relationship between each page extent and its associated control symbol 204 or URL symbol 206. Although having different reference numerals, each page extent 370 and 372 is generated and operates in an identical manner. As depicted in this figure, URI symbol 206c is surrounded by a user mark 170.

As will be described in greater detail below, server 100 uses page extents 370 and 372 to determine which control symbols 204 and URL symbols 206 have corresponding user marks 170. In the preferred embodiment, server 100 retrieves the transmitted control page 150a, from memory 120, corresponding to the received user control page. Those skilled in the art will recognize that transmitted control page 150a could be reconstructed from available data such as a document 112 in web 108. Such a reconstruction procedure allows server 100 to minimize the amount of required memory 120, at the cost of performance.

Upon server 100 receiving user control page $150b_3$, controller 130 retrieves the corresponding transmitted control page $150a_3$ (not shown) based on the identifying information 202 and performs a bitmap comparison between transmitted control page $150a_3$ and the user control page $150b_3$. Skew indicators 208 allow controller 130 to properly align the control pages for this comparison if user control page $150b_3$ is crooked as it is fed into fax machine 102.

The bitmap comparison produces a difference page 365 as depicted in FIG. 3c. Difference page 365 contains the identified difference 375. Identified difference 375 is comprised of any physical mark on user control page $150b_3$ that was not present on transmitted control page $150a_3$. Thus, identified difference 375 corresponds to user mark 170.

It should be noted that some spurious marks 170 will appear on the received user control page $150b_3$ as a result of the facsimile transmission process. Those skilled in the art will recognize that controller 130 can be programmed to filter out or ignore a mark 170 of this nature.

Once the identified difference 375 has been identified (335), controller 130 determines (340) the control symbol 204 or URL symbol 206 associated with the identified difference 375. This is accomplished by first determining the center 385 of identified difference 375. Those skilled in the art will recognize several ways of accomplishing this task. Perhaps the simplest is to create a rectangular bounding region 380 that encompasses identified difference 375. As understood by those skilled in the art, the corners of rectangular bounding region 380 are defined by the coordinate pairs, in a counter-clockwise direction from the bottom left corner of bounded region 380, $(X_{min}, Y_{min})$ $(X_{max}, Y_{min})$ $(X_{max}, Y_{max})$ and $(X_{min}, Y_{max})$. Using geometry, the center 385 of bounding region 380 will be defined by the coordinate pair $(X_{center}, Y_{center})$, where $(X_{center}, Y_{center})$ are:

$$x_{center} = \frac{x_{max} - x_{min}}{2} \quad y_{center} = \frac{y_{max} - y_{min}}{2}$$

Controller 130 then compares center 385 to each page extent 370 and 372. If center 385 is within a page extent 370 or 372, server 100 will then either perfom (345) the action or retrieve (360) the document dictated by the symbol associated with the page extent. If however, center 385 is not within a page extent 370 or 372, server 100 will generate (355) and transmit a control page 150a indicative of an error. If the symbol is an image map, server 100 can transmit the coordinate pair of center 385 to Internet 106.

It should be recognized that use of rectangular page extents, as described above, simplifies the location of identified differences corresponding to user selections. Other shapes could be used for page extents.

Although FIG. 3c illustrates the use of a circular user mark 170, those skilled in the art will recognize that a similar process could be used with user marks 170 of differing printed forms such as a scribble or an "X" mark over or near a control symbol 204 or a URL symbol 206. To accommodate these types of marks 170, controller 130 would have to be modified to expand the page extents 370 and 372 to include any area where a user might place a check mark or underline. Otherwise, controller 130 could be modified to associate user mark 170 with the page extent 370 or 372 that was closest to the center 385 of the user mark 170. Special rules could also be embedded in controller 130 that would generate an error condition if the distance between the center 385 and the nearest edge of a page extent 370 or 372 was farther then a specified distance.

Those skilled in the art will recognize that this procedure can be modified to operate with more than one identified difference 375. Specifically, controller 130 can be programmed to generate a plurality of separate bounding regions 380, each having a specified size, for each identified difference. Controller 130 could be configured to recognize where one identified difference began and another left off. For example, each contiguous difference can be defined as an identified difference 375, associating a page extent 370 or 372 with the identified differences 375 having centers 385 within a page extent, and treating identified differences 375 with centers falling between associated page extents as being in boundary regions between marks 170.

If controller 130 determines that an identified difference 375 corresponds with a control symbol 204, server 100 will perform (345) the command action associated with the control symbol 204 described in Table 1 above. Once the command action has been performed (345) server 100 generates (350) and transmits (320) a transmitted control page 150a containing information that confirms that the requested action has been performed.

If the identified difference corresponds with a URL symbol 206, server 100 retrieves (360) the corresponding document 112 from web 108 and converts (365) the retrieved document 112 into a transmitted control page 150a. The control page 150a is then transmitted (320) to fax machine 102.

When converting (365) document 112, it may be necessary to scale document 112 to fit on the paper size selected for control page 150a. It should also be noted that controller 130 can be programmed to convert document 112 into one or more control pages 150a if excessive scaling would be needed to fit document 112 onto a single control page 150a.

If the identified difference does not correspond with a control symbol 204 or URI, symbol 206, then server 100 generates (355) a transmitted control page 150a, indicating an error condition, which is transmitted (320) to fax machine 102. A similar control page 150a is also generated (355) and transmitted (320) to fax machine 102 if server 100 is unable to perform the action required by a marked control symbol 204 or retrieve the document identified by a marked URL symbol 206.

In the preferred embodiment, whenever server 100 generates (step 310, 350, and 355) a transmitted control page 150a or converts (365) a document 1012 into a transmitted control page, it appends identifying information 202 thereon. This identifying information is used to retrieve the proper transmitted control page 150a to be used in identifying (335) differences between the transmitted control page 150a and the user control page 150b.

It should be appreciated that the present invention relies on transmission of images between server 100 and fax machine 102. Nevertheless, some communications between a user and a network system such as 106 require transmission of text and/or numeric data. Examples of this type of communication include searching databases or locating a particular type of information on the Internet.

Figure 4:
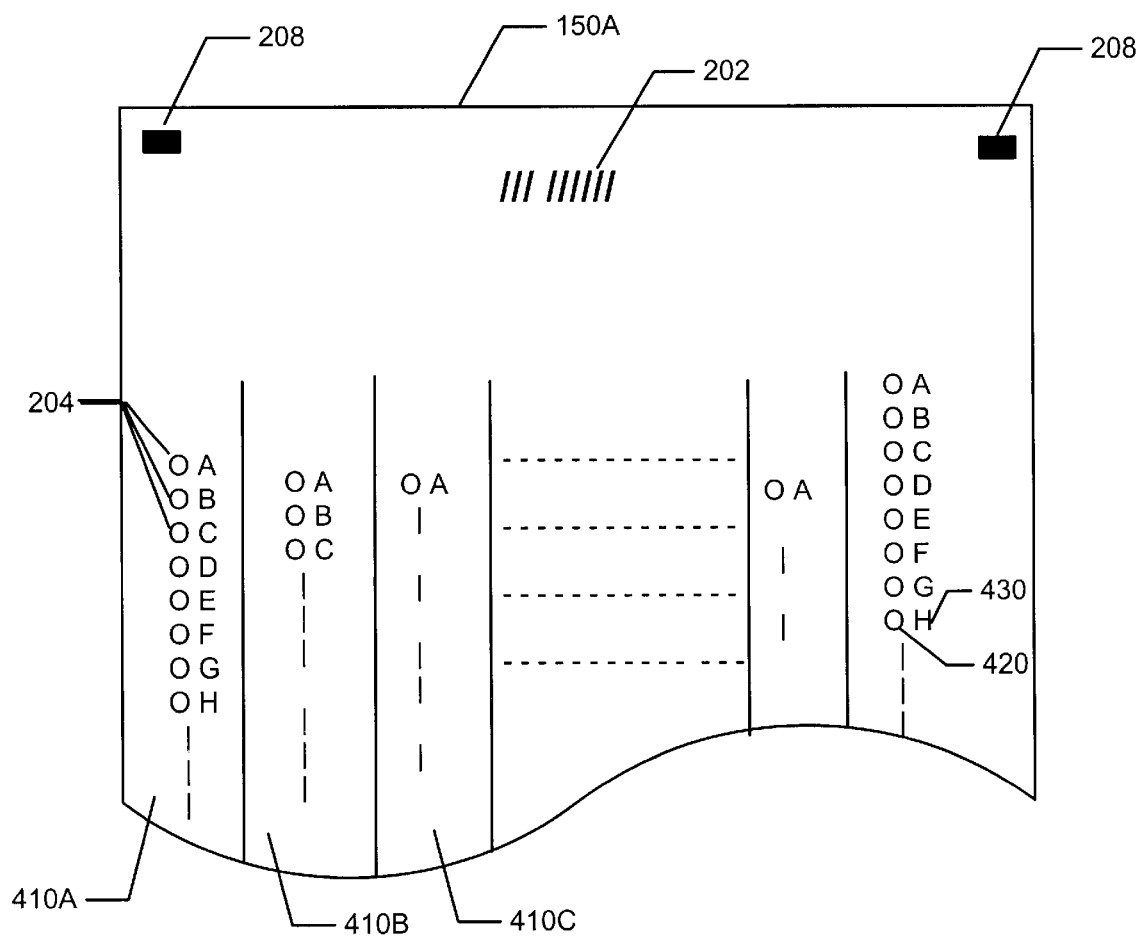
FIG. 4 depicts a specialized control page for inputting alphabetic and numeric information.

However, it is possible to transmit text and/or numeric data by treating each letter or number as a control symbol 204. An example of a specialized transmitted control pace $150a_4$ referred to as a bubble form, is depicted in FIG. 4. Transmitted control page $150a_4$ has a plurality of control symbols 204 arranged in columns 410, with each column 410 representing a single character position. Each control symbol 204 is comprised of an oval 420 and an associated reference character 430 which is a letter of the alphabet or a number between 0 and 9.

The depicted transmitted control page $150a_4$, is particularly useful for searching databases, because it allows entry of text or numeric data. A user enters data by darkening (by placing marks 170 within) a single oval 420 in each column 410. Those skilled in the art will recognize that other control symbols 204, similar to those depicted in Table 1, can also be added to transmitted control page $150a_4$.

When server 100 receives the corresponding user control page $150b_4$, it identifies the oval 420 having the user mark 170 for each column and determines the associated reference character 430. This text or numeric data is then used for a variety of functions including querying a search engine, identifying a specific URL 114, or even identifying an e-mail address.

Although this invention has been described with reference to preferred embodiments, those skilled in the art will recognize changes that are within the scope and spirit of the teachings of this invention. Specifically, although the preferred embodiment disclosed an apparatus and method for retrieving documents from web 108, the network interface 165 disclosed herein can be modified to interface with a single computer, computer networks, or even other parts of the Internet. Moreover, server 100 can be modified to interface with gopher, ftp, telenet, or e-mail protocols.

It should also be noted that an infinite number of transmitted control pages 150a can be generated to perform a variety of functions. For example, a transmitted control page 150a could contain a region that server 100 converts to a bitmapped image. This region would then be transmitted to another party connected to the Internet, thus allowing a user to send bitmapped e-mail messages. With the addition of handwriting recognition capabilities to controller 130, the bitmapped images could be converted to ASCII text for more efficient e-mail transmission or real time chat. Handwriting recognition software would also permit a user to control fax server 100 by simply writing commands on a user control page 150b.

The present invention is also capable of accessing video information. If a retrieved document 112 contains video information, server 100 can convert the video information to a sequence of control pages 150a. Depending on the user preference, one large image can be displayed on each control page 150a, or a number of smaller images can be displayed on each control page 150a.

The present invention is also capable of accessing audio information. Specifically, if a user accesses a document 112 containing audio information, server 100 will generate a control page 150a containing a telephone number and a numeric ID. The user utilizes the telephone number and numeric ID to access an audio server which will play the audio information. In those areas having caller ID, server 100 can be modified so that the numeric ID is not required. Server 100 can also be modified to call the user automatically at a designated telephone number with the requested audio information.

The present invention could also be used by a business to distribute information efficiently to its clients or prospective customers. More precisely, if a customer requests general product information from a business, that business could fax the customer a control page listing its products. If the customer wants more specific information on any particular product, he or she simply circles that product and faxes the control page to the fax/Internet server. The server identifies the circled product(s) and faxes the requested information to the user, thus permitting customers to access the businesses database without the expense of mailing an entire catalog.

In this particular implementation, the server need not be connected to the Internet, but instead to a single computer containing the required information. Those skilled in the art will recognize that this particular embodiment allows business to provide customers and potential customers access to its computerized product database even though the customers don't own a computer.

It should be appreciated that the present invention includes the use of any device that utilizes a fax protocol for communication between the Internet and the fax device. Thus, the Internet can be accessed by a fax card on a computer, even when the computer is not set up for direct Internet communication.

One advantage of the present invention is that Internet access may be made more available in less developed parts of the world, where there are few computers available with direct access to the Internet.

Another advantage of the present invention is that it allows long-distance transmission of fax messages via the Internet. A sender can access the Internet via a local phone call to a server, thereby avoiding long-distance or international telephone charges.

This invention is not intended to be limited by the preferred embodiments, but instead by the following claims.

What is claimed is:

1. An apparatus for exchanging information between a fax machine and a computer network, having at least one electronic document, comprising:
   a facsimile interface configured for transmitting and receiving control pages, each control page having at least one control symbol for initiating a plurality of web browser functions other than document retrieval and at least one URL symbol associated with the at least one electronic document, located thereon, said received control page having at least one user marking thereon associated with the at least one control symbol and the at least one URL symbol;
   a controller, connected to said facsimile interface, configured to compare the transmitted and received control pages and to identify the at least one control symbol and the at least one URL symbol having the at least one user mark associated therewith;
   a network interface, connected to said controller, for performing a function based on a combined analysis of the at least one control symbol and the at least one URL symbol having the at least one user mark associated therewith; and
   said controller further configured to generate a new transmitted control page which includes a plurality of the control symbols as well as a document related to performance of the function, wherein the new transmitted control page replaces the transmitted control page upon transmission of the new control page over the facsimile interface.

2. The apparatus of claim 1 further comprising:
   a memory, connected to said controller, configured for storing and providing access to the transmitted control pages.

3. The apparatus of claim 1 wherein the function includes retrieving the document from the network which is identified by the at least one user marks proximate to one of the at least one URL symbols.

4. The apparatus of claim 1 wherein the function includes at least one of:
   storing a selected one of the at least one URL symbols in a hotlist;
   printing the hot list;
   forwarding to a first document represented by one of the at least one URL symbols in a history list;
   going backward to a second document represented by one of the at least one URL symbols in the history list;
   returning to a homepage;
   performing a search on the network with identified text on the control received page;
   performing at least one email function; and
   performing at least one telenet command.

5. A method for exchanging information between a fax machine and a computer, comprising the steps of:
   receiving at least one received control page from said fax machine to said computer, said at least one received control page having at least one control symbol for initiating a plurality of web browser functions other than document retrieval, at least one URL symbol associated with at least one document, and an identification symbol positioned thereon;
   reading the identification symbol and retrieving a corresponding transmitted control page from memory;
   identifying a difference between the received control page and the corresponding transmitted control page, said difference corresponding to a position of at least one user marking;
   performing a function in response to determining a location of the at least one control symbol and the at least one URL symbol with respect to the at least one user marking; and
   generating a new transmitted control page which includes a plurality of the control symbols, a document generated as a result of performing the function, and a new identification symbol; and
   storing the new transmitted control page in memory so as to be retrievable through use of the new symbol.

6. The method of claim 5 wherein the step of performing a function includes retrieving a document associated with the URL symbol from a computer network.

7. The method of claim 6 further comprising the step of transmitting the new transmitted control page to the fax machine.

8. The method of claim 6 wherein said computer network is the Internet.

9. The method of claim 5 wherein the new transmitted control page may include a document associated with one of the at least one URL symbols.

10. The method of claim 5 wherein the function may include at least one of:
   storing a selected one of the at least one URL symbols in a hotlist;
   printing the hot list;
   forwarding to a first document represented by one of the at least one URL symbols in a history list;
   going backward to a second document represented by one of the at least one URL symbols in the history list;
   returning to a homepage;

performing a search on the network with identified text on the received control page;

performing at least one email function; and performing at least one telenet command.

11. A method for exchanging information between a fax machine and a computer, comprising the steps of:

transmitting a transmitted control page which includes plurality of control symbols for performing web browser functions to said fax machine;

storing the transmitted control page in memory;

receiving at least one received control page from said fax machine at said computer, said at least one received control page having at least one control symbol for initiating a plurality of web browser functions other than document retrieval, at least one URL symbol associated with at least one document, and at least one user mark associated located thereon;

comparing the at least one received control page with the transmitted control page to identify the at least one control symbol and the at least one URL symbol having the at least one user mark associated therewith;

performing a function as a result of the identification of the at least one control symbol in proximity to the at least one control symbol and the at least one URL symbols;

generating a new transmitted control page which includes a plurality of the control symbols with a document generated as a result of performing the function; and storing the new transmitted control page in memory as the transmitted control page.

12. The method of claim 11 wherein the step of performing a function comprises retrieving the document from the data network associated with the at least one URL symbol.

13. The method of claim 12 further comprising the step of transmitting the new transmitted control page to a user.

14. The method of claim 11 wherein said computer network is the Internet.

15. The method of claim 11 wherein the step of performing a function comprises at least one:

storing a selected one of the at least one URL symbols in a hotlist;

printing the hot list;

forwarding to a first document represented by one of the at least one URL symbols in a history list;

going backward to a second document represented by one of the at least one URL symbols in the history list;

returning to a homepage;

performing a search on the network with identified text on the received control page;

performing at least one email function; and performing at least one telenet command.

* * * * *

UNITED STATES PATENT AND TRADEMARK OFFICE
CERTIFICATE OF CORRECTION

PATENT NO.   : 6,348,970 B1
DATED        : February 19, 2002
INVENTOR(S)  : Marx It is certified that error appears in the above-identified patent and that said Letters Patent is hereby corrected as shown below:

<u>Column 3,</u>
Line 50, delete the word "hypcrlink" and insert therefor -- hyperlink --;

<u>Column 5,</u>
Line 56, delete the word "Iink" and insert therefor -- Link --;

<u>Column 7,</u>
Line 53, delete the word "scrver' and insert therefor -- server --;

<u>Column 10,</u>
Line 51, delete the word "perfom" and insert therefor -- perform --.

Signed and Sealed this

Eighteenth Day of June, 2002

*Attest:*

JAMES E. ROGAN
*Attesting Officer*   *Director of the United States Patent and Trademark Office*